United States Patent
Song et al.

(10) Patent No.: US 12,534,781 B2
(45) Date of Patent: Jan. 27, 2026

(54) METHOD OF PRODUCING ALUMINUM ALLOY MATERIAL HAVING THERMAL BONDING FUNCTION IN SINGLE LAYER

(71) Applicant: UACJ Corporation, Tokyo (JP)

(72) Inventors: Ram Song, Tokyo (JP); Keita Fukawa, Tokyo (JP); Yuki Totani, Tokyo (JP)

(73) Assignee: UACJ Corporation, Tokyo (JP)

( * ) Notice: Subject to any disclaimer, the term of this patent is extended or adjusted under 35 U.S.C. 154(b) by 373 days.

(21) Appl. No.: 18/256,354

(22) PCT Filed: Dec. 23, 2021

(86) PCT No.: PCT/JP2021/047827
§ 371 (c)(1),
(2) Date: Jun. 7, 2023

(87) PCT Pub. No.: WO2022/138806
PCT Pub. Date: Jun. 30, 2022

(65) Prior Publication Data
US 2024/0102134 A1    Mar. 28, 2024

(30) Foreign Application Priority Data
Dec. 25, 2020 (JP) .................. 2020-216805

(51) Int. Cl.
*C22C 21/02* (2006.01)
*B22D 11/06* (2006.01)
(Continued)

(52) U.S. Cl.
CPC .......... *C22C 21/02* (2013.01); *B22D 11/0622* (2013.01); *C22C 1/026* (2013.01); *B22D 11/003* (2013.01)

(58) Field of Classification Search
None
See application file for complete search history.

(56) References Cited

U.S. PATENT DOCUMENTS

| 8,025,093 B2* | 9/2011 | Morishita | ............ B22D 11/003 164/428 |
| 2003/0015573 A1* | 1/2003 | Kawahara | ............ F28F 21/084 228/183 |

(Continued)

FOREIGN PATENT DOCUMENTS

| EP | 2998412 A1 | 3/2016 |
| EP | 3006888 A1 | 4/2016 |

(Continued)

OTHER PUBLICATIONS

Extended European Search Report (EESR) corresponding to counterpart International Patent Application PCT/JP2021/047827 mailed Oct. 16, 2024.

(Continued)

*Primary Examiner* — Seth Dumbris
(74) *Attorney, Agent, or Firm* — Renner, Otto, Boisselle & Sklar, LLP (57) ABSTRACT

A method of producing aluminum alloy material having a thermal bonding function in a single layer and including 2.00 mass % to 3.00 mass % Si, 0.01 mass % to 0.50 mass % Fe, and 0.80 mass % to 1.50 mass % Mn includes a casting process performing a twin roll type casting to form a plate having a thickness of 3 mm to 12 mm by rotating a roll having a diameter D (mm) at peripheral velocity v (mm/min) being satisfying a following formula of $0.057 \times v + 0.0016 \times D \leq 33.54$.

4 Claims, 4 Drawing Sheets

(51) Int. Cl.
*C22C 1/02* (2006.01)
*B22D 11/00* (2006.01)

(56) References Cited

U.S. PATENT DOCUMENTS

| 2015/0050520 | A1* | 2/2015 | Niikura | B32B 15/016 |
| | | | | 420/544 |
| 2016/0089860 | A1* | 3/2016 | Kurosaki | C22C 21/02 |
| | | | | 148/552 |
| 2019/0153576 | A1 | 5/2019 | Kurosaki | |

FOREIGN PATENT DOCUMENTS

| JP | H10-102178 A | 4/1998 |
| JP | 2007-268547 A | 10/2007 |
| JP | 2017-025378 A | 2/2017 |

OTHER PUBLICATIONS

Tomohito Kurosaki et al., "Influence of Manganese Amount and Brazing Conditions on the Brazeability and the Shape Resistance of the Al—Si Based Alloy Sheets for Brazing", UACJ Technical Reports, vol. 7 (2020), pp. 30-36, Paper.

International Search Report (ISR) (form 210) from the Japan Patent Office corresponding to counterpart International Patent Application PCT/JP2021/047827, date of mailing Feb. 1, 2022.

\* cited by examiner

METHOD OF PRODUCING ALUMINUM
ALLOY MATERIAL HAVING THERMAL
BONDING FUNCTION IN SINGLE LAYER

This application is a national phase of International Application No. PCT/JP2021/047827 filed Dec. 23, 2021, which claims priority to Japanese Application No. 2020-216805 filed Dec. 25, 2020, each of which is hereby incorporated herein by reference in its entirety.

TECHNICAL FIELD

The present invention relates to a method of producing aluminum alloy material having a thermal bonding function in a single layer.

BACKGROUND ART

In the twin roll type continuous casting, molten metal such as aluminum is supplied to a space between a pair of cooling rolls (referred to as twin rolls) that are arranged in an upper-bottom direction and the molten metal is contacted with the twin rolls to be solidified and a plate is formed. Furthermore, the twin rolls apply a load on the molten metal that is being solidified such that the molten metal is continuously processed to be deformed into a plate.

Productivity is relatively low in producing plates with the twin roll type continuous casting compared to that with a generally performed production method for producing plates with performing semi-continuous casting and hot rolling sequentially. However, with the twin roll type continuous casting, a thin plate can be directly produced from molten metal. Therefore, the hot rolling step can be omitted or simplified and this can effectively reduce energy consumption. In producing plates with the twin roll type continuous casting, the cooling rate of cooling the plate during the casting is high. Therefore, large amounts of solute elements can be dissolved in the aluminum parent phase in a solid state and a supersaturated solid solution can be obtained. Furthermore, in the thermal processing step performed thereafter, large amounts of fine precipitates can be created. Therefore, grain growth of the crystal grains in the plate can be reduced in the thermal bonding step. In the plastic deformation of material, strength can be improved by pinning, which suppresses movement of dislocation. In this respect, attempts have been made to obtain a thin metal plate of aluminum with the twin roll type continuous casting.

PRIOR ART DOCUMENT

Patent Document

Patent Document 1: Japanese Unexamined Patent Application Publication No. 2017-25378

SUMMARY OF THE INVENTION

Problem to be Solved by the Invention

However, in the producing of plates with the twin roll type continuous casting, centerline segregation is likely to occur.

In the process of cooling with the twin rolls, according to the progress of solidification of the molten metal, some of the supersaturated solute elements dissolved in the solid phase move to the liquid phase through a solid-liquid interface and are concentrated at interdendritic regions near the solid-liquid interface. Namely, segregation occurs.

The solute elements are concentrated and the centerline segregation occurs at a plate thickness center portion of the plate (a center portion with respect to a plate thickness) where solidification is completed. Deficiencies in casting such as pores created by solidification and shrinkage are caused in the plate thickness center portion.

If remarkable centerline segregation occurs near the plate thickness center portion of the plate, the centerline segregation remains in the rolling step and also in a coil obtained after the rolling step. The centerline segregation portion remaining in the coil has a high concentration of solute elements and has a structure different from that of the aluminum base. This may greatly lower brazing performance and cracking may occur due to the centerline segregation when the plate is processed into a fin and the fin may be broken. In the thermal processing step, the centerline segregation portion is melted again and volume expansion occurs. The volume expansion may cause adhesion defects. Therefore, the technology of reducing the centerline segregation is required. However, due to the large amount of solute and a large area, the centerline segregation is less likely to be eliminated completely by performing the thermal processing with diffusing.

The present invention was made in view of the above circumstances. An object is to provide a method of producing aluminum alloy material with less occurrence of centerline segregation.

Means for Solving the Problem

A method of producing aluminum alloy material according to the present invention is a method of producing aluminum alloy material having a thermal bonding function in a single layer and including Si of 2.00 mass % to 3.00 mass %, Fe of 0.01 mass % to 0.50 mass %, and Mn of 0.80 mass % to 1.50 mass %. The method includes a casting process of performing twin roll type continuous casting by rotating a roll having a diameter D (mm) at peripheral velocity v (mm/min) with satisfying a following formula (1).

[formula 1]

$$0.057 \times v + 0.0016 \times D \leq 33.54 \qquad (1)$$

According to the method of producing the aluminum alloy material, the aluminum alloy material with less occurrence of centerline segregation can be obtained. The inventors of the present invention found the method of producing aluminum alloy material based on the engineering with the actual casting results and the numeric analysis.

The above-described formula (1) will be described below. As described above, some of the solute elements of the super-saturated solid solution in the solid phase move to the liquid phase through the solid-liquid interface and are concentrated near the solid-liquid interface and accordingly, the centerline segregation occurs near the plate thickness center portion of the plate. Namely, occurrence of the centerline segregation depends on an area of a solid liquid region that remains near the plate thickness center portion when the molten aluminum supplied from the nozzle end to the space between the twin rolls starts to be solidified by cooling with the twin rolls and passes through the space between the twin rolls. In the solid liquid region, the solid phase and the liquid phase coexist. Therefore, the length of the solid liquid region near the plate thickness center portion influences on occurrence and degree of centerline segregation. Namely, as the solid liquid region near the plate thickness center portion becomes longer, material stays in the solid liquid state for a longer time. This increases the amount of solute elements moving from the solid phase and the centerline segregation becomes remarkable. On the other hand, with the solid liquid region near the plate thickness center portion being shorter, the amount of solute elements moving from the solid phase is decreased and the centerline segregation becomes less remarkable. The solid liquid region corresponds to a physical distance between a position where the temperature of molten aluminum in the plate thickness center portion is equal to the liquidus temperature of the aluminum alloy material (hereinafter, referred to as a liquidus temperature position) and a position where the temperature of molten aluminum in the plate thickness center portion is equal to the solidus temperature of the aluminum alloy material (hereinafter, referred to as a solidus temperature position).

With using numeric analysis, the inventors of the present invention calculate the distances with which the temperature of the plate thickness center portion in the twin roll type continuous casting is equal to or lower than the liquidus temperature of the aluminum alloy material and equal to or higher than the solidus temperature of the aluminum alloy material. The inventors found correlation between the calculated distances and the centerline segregation obtained by the actual casting experiments. Model systems and model formulae that are used for the numeric analysis will be described below.

Figure 1:
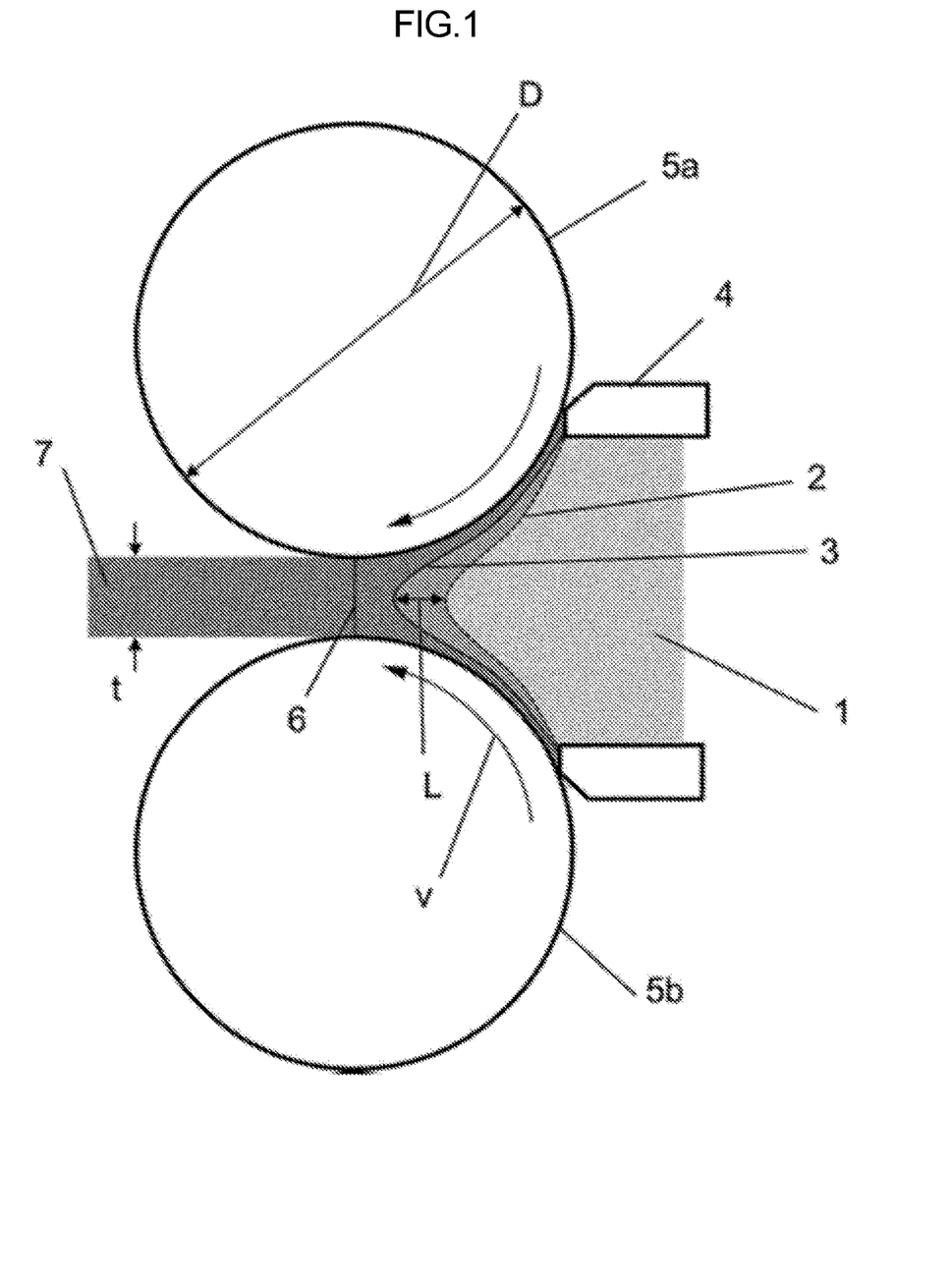
FIG. 1 is a schematic view of numeric analysis according to the present invention.

FIG. 1 is a schematic view of a model with which the numeric analysis was performed for the plate thickness center portion in the twin roll type continuous casting. The numeric analysis was performed for a plate width center portion based on quadratic heat transfer equations with the numeric analysis range being from the nozzle end where the molten aluminum is contacted with the twin rolls to a roll center position and the plate thickness t being 6 mm to 7 mm. A temperature distribution of the molten aluminum and the plate within the numeric analysis range is calculated and the distance L between the liquidus temperature position and the solidus temperature position is calculated with the numeric analysis.

The following formula (2) represents a quadratic heat transfer equation as a basic formula of the numeric analysis. The following formula (3) represents an equation defining a solid phase ratio. $\rho_A$, $C_A$, $\kappa_A$, H, $f_s$, $T_L$, and $T_S$ represent physical property values of the aluminum alloy material and the physical property values can be obtained from chemical compositions of the aluminum alloy material. Specifically, the physical properties include $\rho_A$: density, $C_A$: specific heat, $\kappa_A$: thermal conductivity, H: latent heat, $f_s$: solid phase ratio, $T_L$: liquidus temperature, and $T_S$: solidus temperature. The molten aluminum and a plate are moved from a nozzle tip to a space between the rolls parallel to a x-direction that is perpendicular to a y-direction in which a line connecting a center axis of an upper roll 5a of the twin rolls and a center axis of a lower roll 5b extends. The x-direction corresponds to a casting direction and the distance L is a distance along the x-direction. In the following formula (2), the specific heat $C_A$ is obtained with the equivalent specific heat method.

[Formula 2]

$$\rho_A\left(C_A - H\frac{\partial f_S}{\partial T}\right)\left(\frac{\partial}{\partial t} + v\frac{\partial}{\partial x}\right)T_A = \kappa_A\left(\frac{\partial^2}{\partial x^2} + \frac{\partial^2}{\partial y^2}\right)T_A + Q_H \quad (2)$$

[Formula 3]

$$f_S = 1 - \frac{T - T_S}{T_L - T_S} \quad (3)$$

With considering generated heat $Q_H$ generated by complete solidification of the molten aluminum in an area that is contacted with roll surfaces, which is a contact arc length area, the numeric analysis was performed for the area ranging from the solidus temperature position to the roll center position. The generated heat $Q_H$ is obtained by the following formula (4). In the following formula (4), $\delta_y$ represents yield stress of a plate at 500° C., $h_o$ represents a plate thickness at an outlet, $h_s$ represents a plate thickness at the completion of solidification, v represents roll velocity (which is equal to casting speed in this embodiment), $L_s$ represents a distance from the solidus temperature position to the roll center position in a plate thickness center portion, and RH represents a heat exchange rate of the processing work by the rolls. The roll center position is a center of a line that connects center axes of the upper roll 5a and the lower roll 5b of the twin rolls.

[Formula 4]

$$Q_H = \sigma_y \ln\left[\frac{h_S}{h_O}\right]\frac{v}{L_S}R_H \quad (4)$$

Heat transfer between the rolls and each of the molten aluminum and the plate is represented by the following formula (5). In the formula (5), $T_R$ represents a roll surface temperature and $h_{R-A}$ represents heat transfer coefficient between the roll surface and each of the molten aluminum and the plate. The following formula (6) is a basic formula related to thermal conductivity within the roll. $\rho_R$, $C_R$, and $\kappa_R$ represent physical property values of the rolls and specifically, the physical property values include $\rho_R$: density, $C_R$: specific heat, and $\kappa_R$: thermal conductivity. The upper roll 5a and the lower roll 5b have the same diameter D and the same physical property values $\rho_R$, $C_R$, $\kappa_R$.

[Formula 5]

$$\kappa_R \frac{\partial T_R}{\partial y} = -h_{R-A}(T_R - T_A) \quad (5)$$

[Formula 6]

$$\rho_R C_R\left(\frac{\partial}{\partial t} + v\frac{\partial}{\partial x}\right)T_R = \kappa_R\left(\frac{\partial^2}{\partial x^2} + \frac{\partial^2}{\partial y^2}\right)T_R \quad (6)$$

Table 1 describes physical property values of the aluminum alloy that are used for the numeric analysis.

TABLE 1

| ITEM | UNIT | INPUT VALUE |
|---|---|---|
| LIQUIDUS TEMPERATURE | C. ° | 641 |
| SOLIDUS TEMPERATURE | C. ° | 573 |
| DENSITY OF LIQUID PHASE | g/cm³ | 2.43 |
| DENSITY OF SOLID PHASE | g/cm³ | 2.69 |
| SPECIFIC HEAT OF LIQUID PHASE | J/kg · K | 1153 |
| SPECIFIC HEAT OF SOLID PHASE | J/kg · K | 1011 |
| THERMAL CONDUCTIVITY OF LIQUID PHASE | W/m · K | 88 |
| THERMAL CONDUCTIVITY OF SOLID PHASE | W/m · K | 186 |

Figure 2:
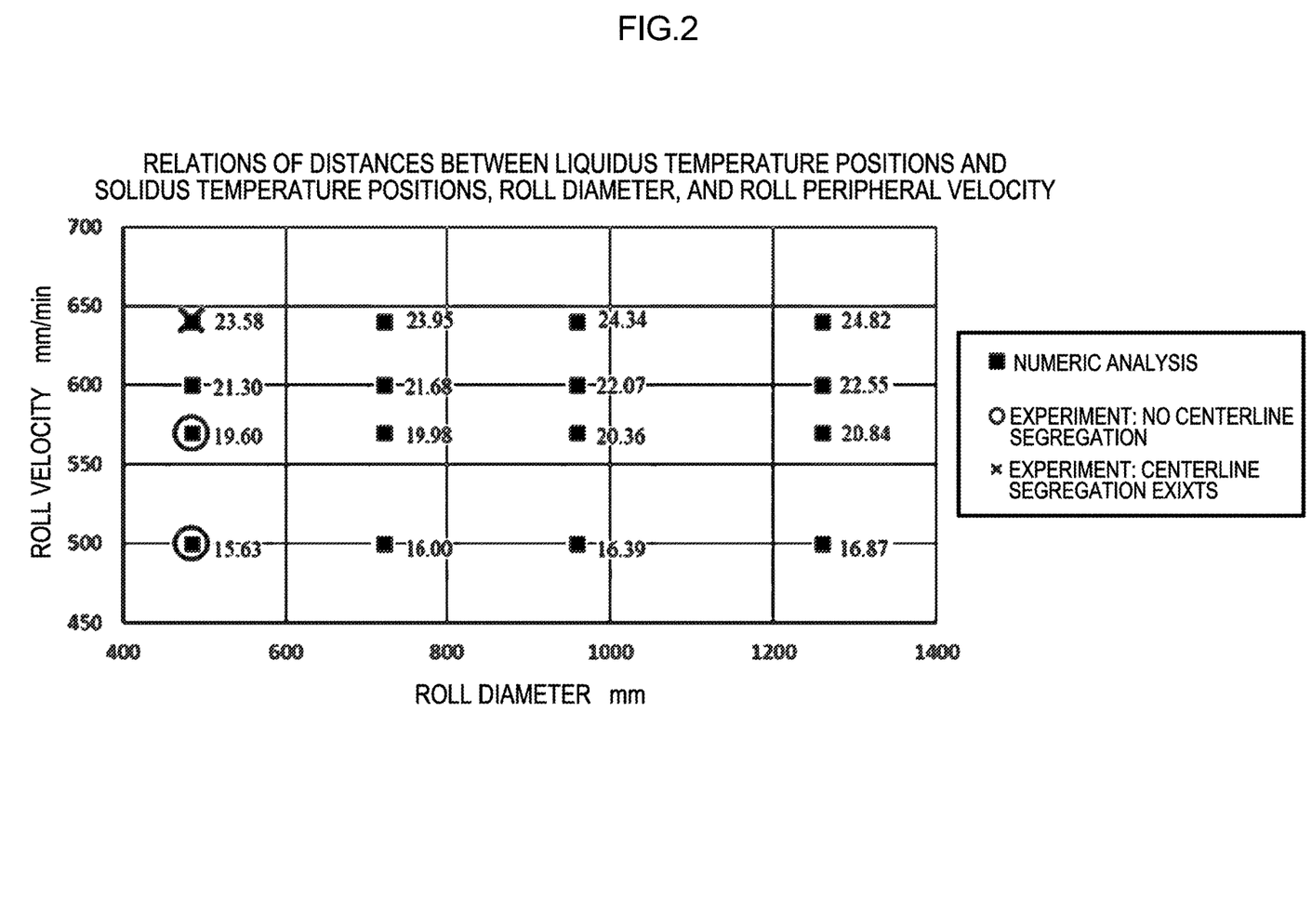
FIG. 2 is a table describing relations of roll diameter, peripheral velocity, and distances between liquidus temperature positions and solidus temperature positions.

The distances L between the liquidus temperature positions and the solidus temperature positions in the plate thickness center portion of the plates that are produced with the twin roll type continuous casting were calculated on the various casting conditions with the numeric analysis. FIG. 2 illustrates one example of the numeric analysis results that represent how the roll diameter D and the roll velocity v influence the distance L. The roll diameter D and the roll velocity v may be simply referred to as a diameter D and velocity v. As illustrated in FIG. 2, it is obvious that the distance L tends to be smaller as the roll diameter D is smaller or the roll velocity v is smaller.

With using the results and representing the distance L (mm) as the function of the roll diameter D (mm) and the velocity v (mm/min) with linear regression, the following formula (7) is obtained.

[Formula 7]

$$L = 0.057 \times v + 0.0016 \times D - 13.54 \quad (7)$$

Furthermore, on several casting conditions, aluminum alloy material was produced by performing actual casting experiments to check whether centerline segregation was observed in the plate thickness center portion. Based on the segregation check results and the numeric analysis result illustrated in FIG. 2, it was found that the distance L that can effectively reduce occurrence of the centerline segregation in the plate thickness center portion is 20 mm or smaller. Therefore, the following formula (8) is obtained as the conditions that do not cause centerline segregation. The formula (1) and formula (C1) are modifications of the formula (8).

[Formula 8]

$$L = 0.057 \times v + 0.0016 \times D - 13.54 \leq 20 \quad (8)$$

More preferable conditions can be defined by the following formula (9). As the distance L is smaller, the centerline segregation is less likely to occur in the plate thickness center portion. The following formula (9) represents a relation of the roll diameter D and the velocity v such that the distance L can be set 16 mm or smaller.

[Formula 9]

$$0.057 \times v + 0.0016 \times D \leq 29.54 \quad (9)$$

The molten metal temperature according to the present invention needs to be controlled to be equal to or lower than a reference temperature that is 80° C. higher than the liquidus temperature of the aluminum alloy material. With the molten metal temperature being high, a non-solidified portion remains in the plate thickness center portion and the plate is likely to be broken at the plate thickness center portion. With respect to the feature of the present invention, the lowest value of the molten metal temperature may not be defined. However, with the molten metal temperature being low, casting troubles are caused by the solidification in the nozzle tip and the plate becomes thicker. Therefore, the twin rolls receive great deformation resistance that increases a load applied on the equipment. In this respect, the lowest value of the molten metal temperature may be defined. The molten metal temperature is measured at a position just before the head box or the nozzle chip. If the measured temperature is equal to or lower than a reference temperature that is 80° C. higher than the liquidus temperature, the molten metal temperature (the casting temperature) at the time the molten metal reaches the rolls is considered to be equal to or lower than the reference temperature. The preferable controlled range of the temperature at the position just before the head box or the nozzle chip includes temperatures that are 20° C. to 80° C. higher than the liquidus temperature of the aluminum alloy material. The temperature range corresponds to the casting temperature range with which the twin roll type casting can be stably performed.

The preferable range of the roll diameter D is from 100 mm to 1500 mm. With the roll diameter D being small, cooling ability of cooling a plate is insufficient and the plate is not completely solidified. This may be likely to cause molten metal leak. With the roll diameter D being greater than 1500 mm, the equipment becomes large in size and it is not practical. The range of the roll diameter D from 500 mm to 1300 mm, which is widely used in the industrial field, is more preferable.

The preferable range of the roll velocity v is from 300 mm/min to 700 mm/min. With the roll velocity v being greater than 700 mm/min, the molten metal is solidified by the rolls fast and the thickness of the solidified shell created by the rolls is reduced. If the roll velocity v is too fast, the molten metal may leak. With the roll velocity v being equal to or lower than 300 mm/min, the thickness of the solidified shell created by the rolls is increased and the rolls receive great deformation resistance that increases a load applied on the equipment. Furthermore, with the roll velocity v being too slow, the molten metal does not flow smoothly and the molten metal within the nozzle may start to be solidified.

The plate thickness t is preferably from 3 mm to 12 mm. With the plate thickness being smaller than 3 mm, the casting of a plate is less likely to be performed stably and molten metal leak and disconnection of a plate are likely to be caused. With the plate thickness t being greater than 12 mm, the twin rolls receive great deformation resistance that increases the load applied on the equipment.

Effects of the Invention

According to the present invention, a method of producing aluminum alloy material with less occurrence of centerline segregation is provided.

MODES FOR CARRYING OUT THE INVENTION

Hereinafter, required elements for an aluminum alloy according to the present invention will be described. Aluminum alloy material described herein is aluminum alloy material that can be thermally bonded to another component in a single layer without using bonding material such as brazing material and filler material. The aluminum alloy material described herein can provide liquid phase, which is required for bleeding and bonding, from the material itself.

Si is an element that generates an Al—Si based liquid phase and contributes to the bonding. With the amount of Si to be added being less than 2.0 mass %, the liquid phase is not generated in a sufficient amount and bleeding of the liquid phase is reduced, thus making the bonding imperfect. On the other hand, with the amount of Si to be added being more than 3.0 mass %, the amount of the liquid phase generated in the aluminum alloy material increases and the material strength during heating is extremely reduced and the shape of the structure is hardly maintained. Therefore, the amount of Si to be added is defined from 2.0 mass % to 3.0 mass %. The amount of the bleeding liquid phase increases as the volume and the heating temperature increase. The amount of the liquid phase to bleed during the heating is set by adjusting the amount of Si and the heating temperature for the bonding, which are required depending on the structure of a structure body to be produced.

Fe is effective not only in increasing the strength by slightly dissolving into the matrix in a solid state but also in preventing reduction of the strength at high temperatures, particularly, by being dispersed as crystallized deposits or precipitates. With the amount of Fe to be added being less than 0.01 mass %, the above-described effects are less likely to be obtained and the ingot of high purity is necessary to be used and this increases a cost. With the amount of Fe to be added being more than 0.50 mass %, coarse intermetallic compounds are generated during casting and problems are caused in productivity. If the bonded component is in corrosive environments (particularly, corrosive environment including flow of a liquid), corrosion resistance is reduced. Furthermore, crystal grains re-crystalized due to the heating during the bonding are reduced in size and this increases grain boundary density. Therefore, the size of the structural component greatly changes before and after bonding. The amount of Fe to be added is from 0.01 mass % to 0.50 mass %.

Mn is an additive element that forms Al—Mn—Si based, Al—Mn—Fe—Si based, and Al—Mn—Fe based intermetallic compounds together with Si and Fe. Mn is an important additive element for increasing the strength by developing the action of dispersion strengthening or by dissolving in the aluminum parent phase in a solid state and developing the action of solid-solution strengthening. With the amount of Mn to be added being more than 1.5 mass %, coarse intermetallic compounds are likely to be formed and corrosion resistance is reduced. With the amount of Mn to be added being less than 0.8 mass %, the above-described effects are insufficient. Therefore, the amount of Mn to be added is from 0.8 mass % to 1.5 mass %.

As described above, the aluminum alloy material produced with the method according to the present invention includes a predefined amount of Si, Fe, and Mn as the necessary elements so as not to be deformed during heating for bonding. For further improving strength, one, two or more kinds selected from a group of Zn, Cu, Zr, and Ti may be added with a predefined amount as a selective additive element.

Addition of Zn is effective in increasing the corrosion resistance with sacrificial anticorrosion action. Zn is substantially uniformly dissolved into the matrix in a solid state. However, if a liquid phase is generated, Zn is dissolved into the liquid phase to increase concentration of Zn in the liquid phase. With the liquid phase bleeding to the surface, the concentration of Zn in the bled portion of the liquid phase increases and the corrosion resistance is increased due to sacrificial anode action. Furthermore, with using the aluminum alloy material of the present invention for heat exchangers, the sacrificial anticorrosion action for protecting tubes against corrosion can be developed by using the aluminum alloy material of the present invention for fins. With the amount of Zn to be added being more than 2.0 mass %, the corrosion rate increases and self-corrosion resistance is reduced. Therefore, the amount of Zn to be added is 2.0 mass % or less.

Cu is an additive element that dissolves into the matrix in a solid state and increases the strength. With the amount of Cu to be added being more than 0.50 mass %, corrosion resistance is reduced. With the amount of Cu to be added being less than 0.05 mass %, the above-described effects are insufficient. Therefore, the amount of Cu to be added is 0.05 mass % to 0.50 mass %.

Zr is precipitated as Al—Zr based intermetallic compounds and develops the effect of increasing the strength after the bonding with dispersion strengthening. Moreover, the Al—Zr based intermetallic compounds act to coarsen crystal grains during the heating. With the amount of Zr to be added being more than 0.30 mass %, coarse intermetallic compounds are likely to be formed and this degrades plastic workability. Therefore, the amount of Zr to be added is 0.30 mass % or less. The amount of Zr to be added is preferably from 0.05 mass % to 0.30 mass %.

Ti has the effects of not only increasing the strength by being dissolved into the matrix in a solid state but also preventing the progress of corrosion in a plate thickness direction by being distributed in a layered pattern. With the amount of Ti to be added being more than 0.30 mass %, giant crystalized deposits are generated and this degrades formability and corrosion resistance. Therefore, the amount of Ti to be added is 0.30 mass % or less. The amount of Ti to be added is preferably from 0.01 mass % to 0.30 mass %.

In the aluminum alloy material according to the present invention, further selective additive elements may be added in addition to the required elements and at least one of the previously-described selective additive elements for improving characteristics of the liquid phase and further increasing the bonding performance. The further selective additive elements are Mg, Ni, Cr, V, Sr, Bi, Na, and Ca and one kind, two or more kinds selected from the further selective additive elements with a predefined amount may be added.

The further selective additive elements include Mg: 0.3 mass % or less, Ni: 0.3 mass % or less, Cr: 0.3 mass % or less, V: 0.3 mass % or less, Sr: 0.1 mass % or less, Bi: 0.3 mass % or less, Na: 0.1 mass % or less, and Ca: 0.05 mass % or less. One kind, two or more kinds of the further selective additive elements are added as necessary. Such trace elements can improve the bonding performance by causing fine dispersion of Si particles and increasing fluidity of the liquid phase. With the amount of each trace element being less than the above-described preferable specified range, the effects of causing fine dispersion of Si particles and increasing fluidity of the liquid phase may be insufficient. With the amount of each trace element being more than the above-described preferable specified range, a drawback such as reduction of the corrosion resistance may be caused.

Figure 3:
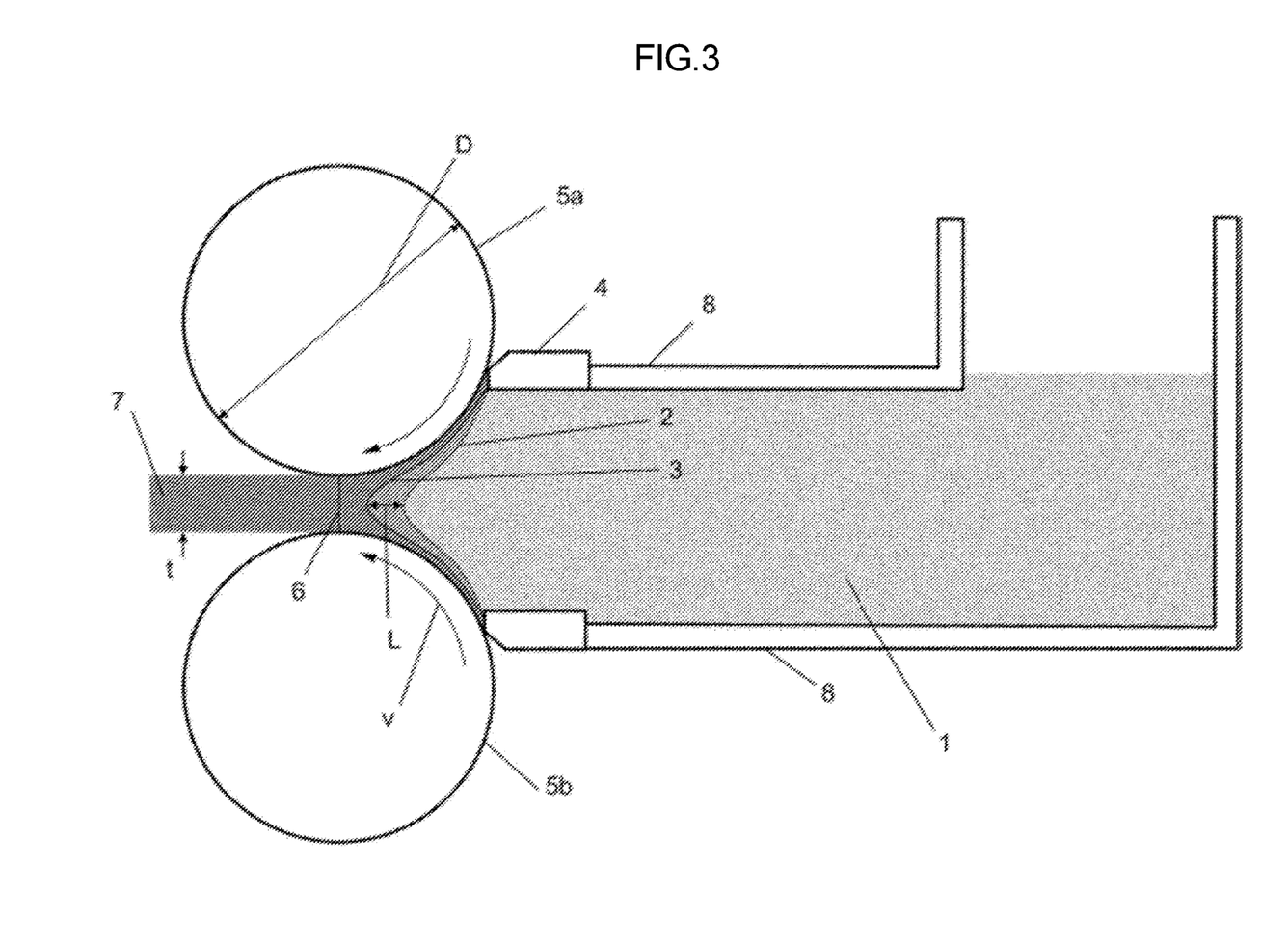
FIG. 3 is a schematic view illustrating a twin roll type continuous casting method according to the present invention.

One embodiment of the present invention will be described with reference to FIG. 3. A twin roll type continuous casting device according to the present embodiment includes a pair of twin rolls 5a, 5b of a water-cooling type and a tank 8. The rolls 5a, 5b are arranged in the upper-bottom direction with having a roll gap 6 therebetween.

Molten aluminum alloy 1 is stored in the tank 8. A nozzle tip 4 is attached to one end of the tank 8 and configured to receive the molten aluminum alloy 1 that is supplied from the tank 8. The twin rolls (an upper roll 5a, a lower roll 5b) are arranged in the upper-bottom direction at a front end of the nozzle tip 4. The twin rolls are rotated at a peripheral velocity v (mm/min) with being contacted with the front end of the nozzle tip 4. A diameter of the upper roll 5a and the lower roll 5b is D (mm).

A method of producing an aluminum alloy plate according to one embodiment of the present invention will be described. The molten aluminum alloy 1 including Si: 2.0 mass % to 3.00 mass %, Fe: 0.01 mass % to 0.50 mass %, and Mn: 0.80 mass % to 1.50 mass % and further including one kind, two or more kinds of Zn: 0.5 mass % to 2.0 mass %, Cu: 0.05 mass % to 0.50 mass %, Zr: 0.05 mass % to 0.30 mass %, and Ti: 0.01 mass % to 0.30 mass %, and the balance: Al and incidental impurities is stored in the tank 8. The molten metal 1 stored in the tank 8 is supplied through the nozzle tip 4 to the space between the twin rolls 5a, 5b that are rotated at the peripheral velocity v (mm/min). The molten metal temperature needs to be controlled to be 20° C. to 80° C. higher than the liquidus temperature of the aluminum alloy material. The molten metal 1 of aluminum alloy material is contacted with the twin rolls 5a, 5b that are cooled by water and starts to be solidified and finally formed into an aluminum alloy material having a plate thickness t (mm). The plate thickness is in a range of 3 mm to 12 mm. In the roll type continuous casting according to the present invention, a relation of the roll diameter D (mm) and the roll peripheral velocity v (mm/min) at the time of casting satisfies the formula (1).

Examples

Hereinafter, Examples according to the present invention and Comparative Examples will be described. Following Examples are described for describing effects of the present invention and do not restrict the technical scope of the present invention by the process and conditions described in Examples.

The aluminum alloy material including Si: 2.46 mass %, Fe: 0.196 mass %, and Mn: 1.21 mass % and further including Zn: 1.483 mass %, and Cu: 0.024 mass % is processed with the twin roll type continuous casting of this embodiment to obtain a plate thickness of 6 mm to 7 mm. Table 2 generally describes Examples and Comparative Examples. Table 2 describes casting conditions, L values obtained by numerical analysis, and existence of the centerline segregation by observing a cross-sectional structure of the plate that is actually produced with casting.

TABLE 2

| ITEM | No. | CASTING TEMPERATURE (° C.) | ROLL DIAMETER D (mm) | ROLL PERIPHERAL VELOCITY v (mm/min) | L (mm) | CENTERLINE SEGREGATION * |
|---|---|---|---|---|---|---|
| EXAMPLE | 1 | 660 | 485 | 500 | 15.63 | ○ |
|  | 2 | 680 | 485 | 500 | 15.63 | ○ |
|  | 3 | 660 | 485 | 570 | 19.60 | ○ |
|  | 4 | 680 | 485 | 570 | 19.60 | ○ |
| COMPARATIVE EXAMPLE | 5 | 660 | 485 | 640 | 23.58 | x |
|  | 6 | 680 | 485 | 640 | 23.58 | x |
| CALCULATION EXAMPLES | 7 | 700 | 720 | 500 | 16.00 | — |
|  | 8 | 700 | 720 | 570 | 19.98 | — |
|  | 9 | 700 | 960 | 500 | 16.39 | — |
|  | 10 | 700 | 1260 | 500 | 16.87 | — |
|  | 11 | 700 | 485 | 600 | 21.30 | — |
|  | 12 | 700 | 720 | 600 | 21.68 | — |
|  | 13 | 700 | 720 | 640 | 23.95 | — |
|  | 14 | 700 | 960 | 570 | 20.36 | — |
|  | 15 | 700 | 960 | 600 | 22.07 | — |
|  | 16 | 700 | 960 | 640 | 24.34 | — |
|  | 17 | 700 | 1260 | 570 | 20.84 | — |
|  | 18 | 700 | 1260 | 600 | 22.55 | — |
|  | 19 | 700 | 1260 | 640 | 24.82 | — |

* ○: no segregation x: segregation exists

—: no casting experiment was performed

In Example (No. 1), casting was performed at the casting temperature of 660° C. and the roll peripheral velocity of 500 mm/min with the roll diameter of 485 mm and no centerline segregation was observed. In the Example, the distance L obtained with the numerical analysis was 15.63 mm. In Example (No. 2), in which only the casting temperature is changed from that in Example (No. 1), the similar result was obtained.

In Comparative Example (No. 5), casting was performed at the casting temperature of 660° C. and the roll peripheral velocity of 640 mm/min with the roll diameter of 485 mm and centerline segregation was remarkably observed. In Comparative Example (No. 6), in which only the casting temperature is changed from that in Comparative Example (No. 5), the similar result was obtained.

Figure 4A:
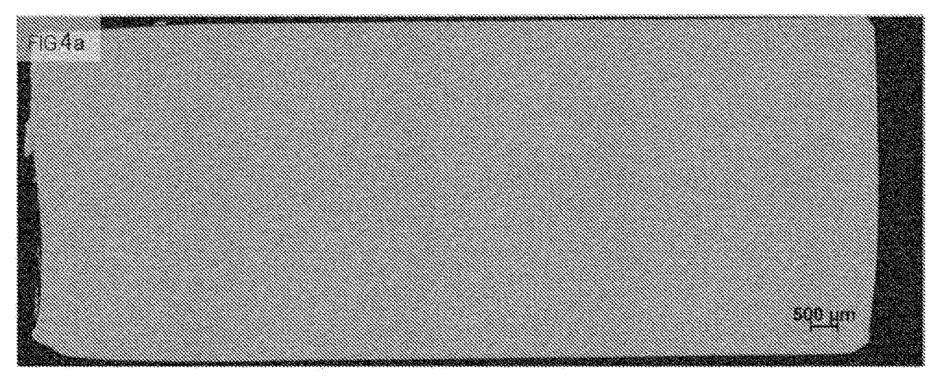
FIG. 4a is a photograph illustrating a cross-sectional structure of a plate of Example according to the present invention.
Figure 4B:
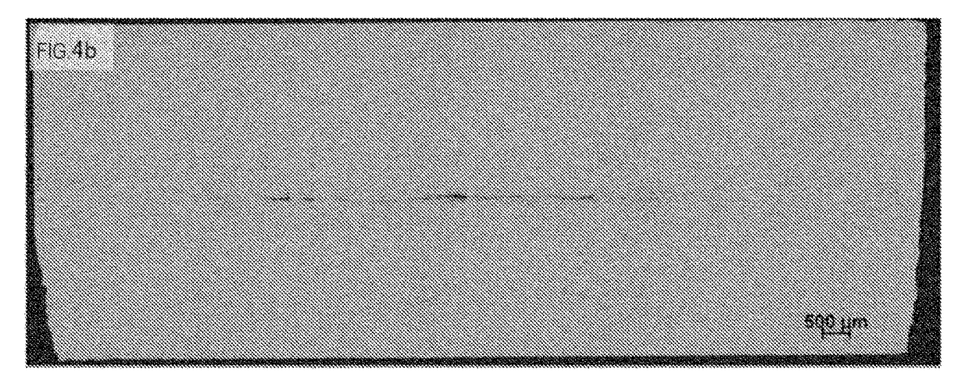
FIG. 4b is a photograph illustrating a cross-sectional structure of a plate of Comparative Example according to the present invention

FIGS. 4a and 4b are photographs of cross-sectional structures of Example (No. 1) and Comparative Example (No. 5). In FIGS. 4a and 4b, a lateral direction corresponds to a casting direction and a vertical direction corresponds to a plate thickness direction. No centerline segregation was observed in Example (No. 1) of FIG. 4a and centerline segregation was remarkably observed in Comparative Example (No. 5) of FIG. 4b.

In Table 2, with respect to the aluminum alloy material having chemical composition same as that of Examples and Comparative Examples, the distances L obtained by performing casting on the various casting conditions are described as calculation examples. The casting conditions of the calculation examples (Nos. 7 to 10) are conditions on which the distances L are 20 mm or smaller and therefore, the centerline segregation may be reduced. On the other hand, the casting conditions of the calculation examples (No. 11 to 19) are conditions on which the distances L are greater than 20 mm and therefore, the centerline segregation may be remarkable.

EXPLANATION OF SYMBOLS

1: molten metal of aluminum alloy
2: liquidus temperature position of aluminum alloy
3: solidus temperature position of aluminum alloy
4: nozzle tip
5: twin roll (5a: upper roll, 5b: lower roll)
6: roll gap
7: aluminum alloy material
8: tank
L: distance between the liquidus temperature position and the solidus temperature position in a plate thickness center portion (mm)
D: roll diameter (mm)
V: roll velocity (mm/min)
t: plate thickness (mm)

The invention claimed is:

1. A method of producing aluminum alloy material having a thermal bonding function in a single layer and including 2.00 mass % to 3.00 mass % Si, 0.01 mass % to 0.50 mass % Fe, and 0.80 mass % to 1.50 mass % Mn, the method comprising:

a casting process performing a twin roll type-casting to form a plate having a thickness of 3 mm to 12 mm by rotating a roll having a diameter D (mm) at peripheral velocity v (mm/min) being satisfying a following formula (C1);

$$0.057 \times v + 0.0016 \times D \leq 33.54 \tag{C1}$$

2. The method of producing aluminum alloy material according to claim 1, wherein molten metal temperature in the casting process is 20° C. to 80° C. higher than liquidus temperature.

3. The method of producing aluminum alloy material according to claim 1, wherein the diameter D (mm) and the peripheral velocity v satisfy a following formula (C2);

$$0.057 \times v + 0.0016 \times D \leq 29.54 \tag{C2}$$

4. The method of producing aluminum alloy material according to claim 1, wherein the aluminum alloy material necessarily includes 2.0 mass % to 3.00 mass % Si, 0.01 mass % to 0.50 mass % Fe, and 0.80 mass % to 1.50 mass % Mn, further selectively includes at least one kind of 0.5 mass % to 2.0 mass % Zn, 0.05 mass % to 0.50 mass % Cu, 0.05 mass % to 0.30 mass % Zr, and 0.01 mass % to 0.30 mass % Ti, and includes balance Al and incidental impurities.

* * * * *